(12) United States Patent
Trainum et al.

(10) Patent No.: US 6,217,068 B1
(45) Date of Patent: Apr. 17, 2001

(54) SAFETY BELT FOR A SLEEPING CHILD/ SMALL PERSON IN A VEHICLE

(76) Inventors: Pat C. Trainum; Douglas J. Trainum, both of P.O. Box 393, Henrico, NC (US) 27842; Melvin L. Crane, 318 S. Cleveland St., Arlington, VA (US) 22204

( * ) Notice: Subject to any disclaimer, the term of this patent is extended or adjusted under 35 U.S.C. 154(b) by 0 days.

(21) Appl. No.: 09/172,373

(22) Filed: Oct. 14, 1998

Related U.S. Application Data

(63) Continuation-in-part of application No. 09/154,207, filed on Sep. 16, 1998.

(51) Int. Cl.$^7$ .................................................. B60R 22/00

(52) U.S. Cl. ........................................ 280/801.1; 297/468

(58) Field of Search ................. 280/801.1, 808; 297/468, 483, 467, 486

(56) References Cited

U.S. PATENT DOCUMENTS

| | | | |
|---|---|---|---|
| 4,706,992 | * | 11/1987 | Downing et al. ................. 280/801.1 |
| 4,770,459 | * | 9/1988 | Nakaiwa et al. .............. 280/801.1 X |
| 4,973,083 | * | 11/1990 | Richards et al. ................. 280/808 X |
| 5,009,469 | * | 4/1991 | Mouri .................................... 297/468 |
| 5,123,673 | * | 6/1992 | Tame .................................... 280/808 |
| 5,131,682 | * | 7/1992 | Reed .................................. 280/801.1 |
| 5,524,928 | * | 6/1996 | Monagas ............................. 280/808 |
| 5,724,920 | * | 3/1998 | Meisman et al. ................. 297/468 X |

* cited by examiner

Primary Examiner—J. J. Swann
Assistant Examiner—F. Zeender
(74) Attorney, Agent, or Firm—Melvin L. Crane, Agent

(57) ABSTRACT

This invention sets forth one or more seat belts which are secured at one end to the vehicle body in front of the seat and which extends upwardly and across the seat to connect with the usual well known buckle. The belt can be a retractable type so that it does not flop around on the floor in front of the seat. The belt can pass through a loop on the upper front of the seat. This belt would be used to protect a person, such as a child, lying prone on the seat such as during sleeping.

6 Claims, 2 Drawing Sheets

SAFETY BELT FOR A SLEEPING CHILD/SMALL PERSON IN A VEHICLE

This invention is directed to a Safety Belt for a sleeping child/small person in a vehicle and more Particularly for a child/small person sleeping on a back seat of an automobile. This invention is a continuation in-part of Ser. No. 09/154,207, filed Sep. 16, 1998.

It is well known that laws have been passed which require a child up to a certain age and weight to be secured in a safety seat. Further, it is well known that children up to a certain age and weight must be restrained by a seat belt and that adults are encouraged to use safety belts while driving or riding in a vehicle.

It is obvious that people get sleepy while riding in a vehicle. It is therefore an object of this invention to restrain a person, more particularly a child, in a comfortable reclined position while sleeping in a vehicle on the back seat.

Another object is to restrain a child during a sleep period by use of the safety belts already provided within the vehicle for normal use.

Other objects and details of the invention will become obvious to those skilled in the art from an understanding of the ensuring description of the drawings.

DETAILED DESCRIPTION OF THE INVENTION

Figure 1:
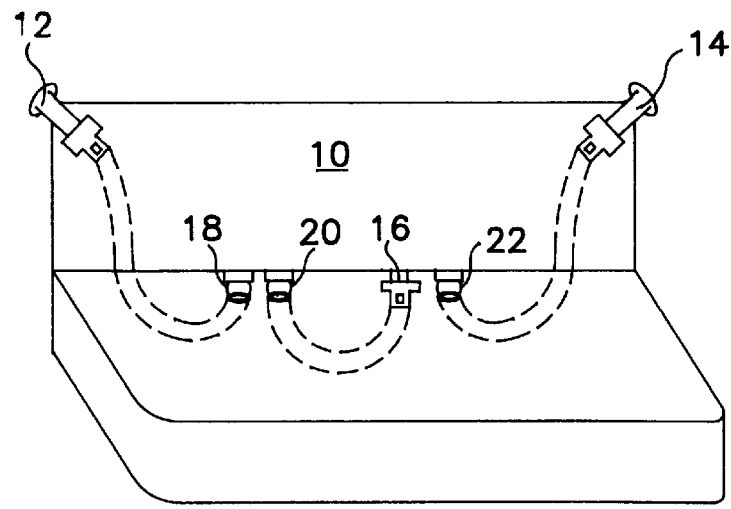
FIG. 1 and FIG. 1A are views illustrating the existing simple arrangements of the seat belts.
Figure 1A:
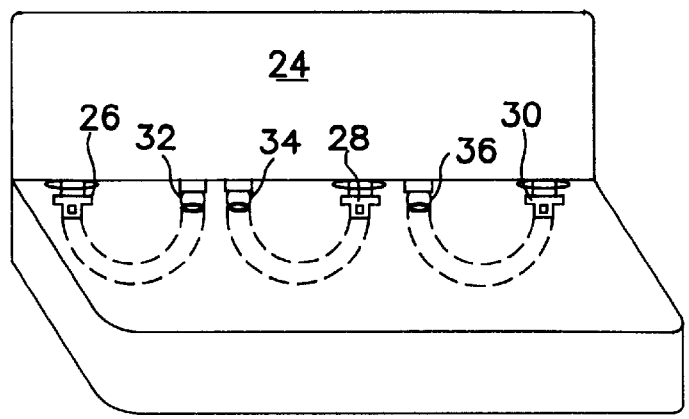

Now referring to the drawings, there is shown a perspective view of a back seat (10) of a vehicle including two shoulder straps (12), (14); one lap strap (16); three securing buckles (18), (20), (22), of any well known type. Also, shown is a view of a back seat (24) of a vehicle including three sets of seat belts (26), (28), (30), each of which are provided with their usual securing tabs or latches (32), (34), (36) of any well known type. Such arrangements are well known and obvious to one skilled in the art.

The invention concept is directed to the use of the regular seat belt which makes use of a buckle on the front side of the seat such as shown by buckles (38), (40), (42). The buckle can be secured to the floor directly in front of the seat or the seat could have an indentation in which the buckle will not be in a person's way during regular use of the back seat. When a child/small person gets sleepy, the child can stretch out on the back seat and use one or two of the belts in order in which the tab or latch is secured to the buckle.

Figure 2:
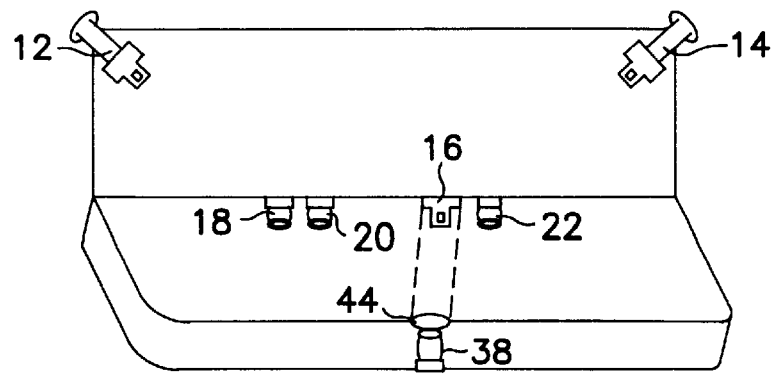
FIG. 2 illustrates a modification of the arrangement set forth in FIG. 1, illustrating a crossed safety belt, shown in dotted lines which provide a more secure arrangement of the seat belts.

It would be obvious as shown in FIG. 2, that a seat belt could be crossed and the tab or buckle buckled to a buckle which is not directly to the front of the belt.

In order to prevent a child from falling to the front of the seat between the seat and the belt when in use, for a child in a reclined position, the seat could be provided with a loop (44) along the upper edge so that the belt could be slipped through the loop and then the tab or latch is secured to the buckle. The child would then be restrained by the safety belt between the loop (44) on the seat and the back of the seat.

It would be obvious to one skilled in the art upon viewing the disclosure that a double buckle could be used at the middle of the seat as well as at the ends. Thus, the belts could be used directly with one buckle and crossed to the other buckle of the double buckle, such as set forth in FIG. 3 in which the belts are shown in full and in dotted lines.

The loop (44) would not be necessary if the buckle were to be attached by a length of material attached to the seat so that the buckle is held close to the upper edge of the seat. By such an arrangement, the child could not slip between the buckle and the seat. Obvious, the safety of the child is of the utmost importance, so that the arrangement of the seat belt and securing of the tab or latch to the buckle is of the best and safest arrangement to prevent any harm to the child.

The invention is directed to the use of a safety belt including a tab or latch connection in combination with a belt buckle which is provided in relationship with a seat such that the buckle is along a surface of the seat which is opposite from a back rest. Thus, as described for a regular seat of a vehicle, the belt and buckle could be associated with a seat which faces to the rear of the vehicle such as in a station wagon or a van. The buckle would be positioned such that the belt passes over a person's body when laying down and then the tab or latch of the belt secured to a buckle to a side of the seat away from the back of the seat.

For the purpose of the invention, the back side will be defined as the side of the seat with a back rest. The front side will be the side of the seat opposite to the back rest, whether the seat faces to the front or to the back.

Figure 3:
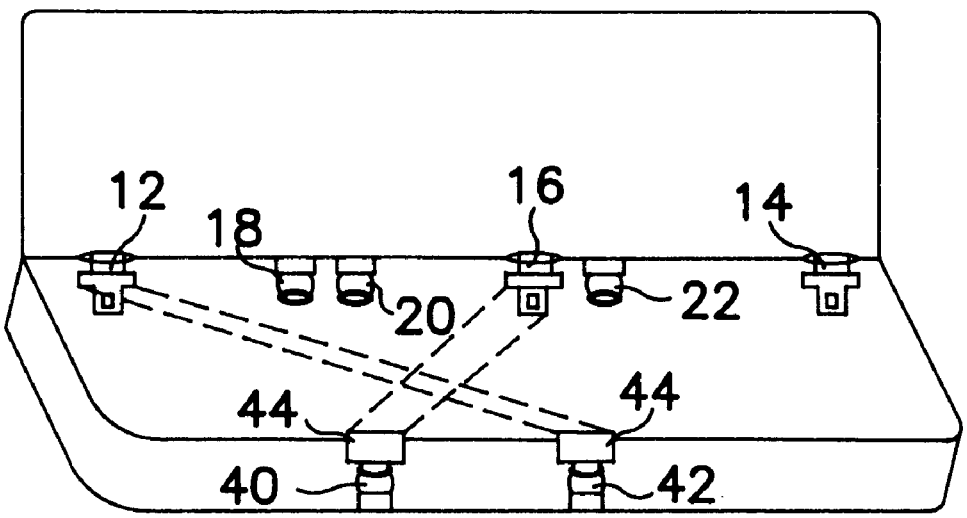
FIG. 3 illustrates a modification of the arrangement set forth in FIG. 1A, illustrating crossed safety belts, some shown in dotted lines which provide a more secure arrangement of the seat belt.
Figure 4:
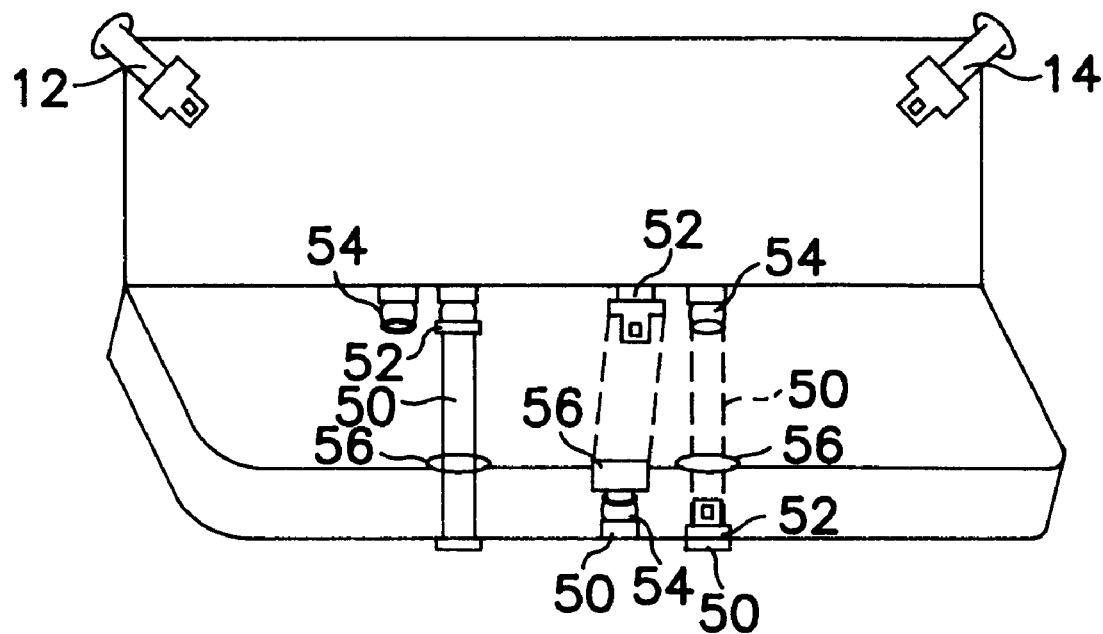
FIG. 4 illustrates a modification of belts secured in front of the seat.

In addition of the above described invention is a seat belt (50) which is secured at one end to the floor of the vehicle immediately in front of the seat. The opposite end of the belt is provided with a latch end (52) which will fit into a buckle (54) to which a normally used belt is secured. In order to prevent the seat belt from flopping around on the floor in front of the seat, the seat belt should be of a retractable type so that the belt will be wound up into a small bundle. In use, the additional seat belt could be added to the seat such as shown in FIGS. 1–3, or added in front of a normally used seat. In order to secure the seat belt (50) in a fixed position across the seat, the belt can pass through a loop (56) secured to the upper front of the seat. The added seat belt can pass through the loop and then pass over a person's body lying prone on the seat and the latch end secured to a regular buckle in order to prevent the person from falling off the seat and to protect the person in case of an accident. More than one belt can be added for additional protection. The belts can be secured somewhat perpendicular to the back of the seat or can be crossed to a buckle at an angle with the back of the seat. The belts are secured to the floor and secured to the normal buckle regularly used with the regular belt of the vehicle.

Instead of the seat belt and buckle already secured in a vehicle, they can be made such that the seat belt and buckle are made outside of the vehicle for being secured later in a vehicle. The belt can be retractable for mounting in front of the seat with a corresponding buckle mounted to the back of the seat. Also, the belt and buckle can be made for the belt to be secured to a place behind the seat with the buckle in front of the seat. A loop could be included in the package for securing the loop to a front edge of the seat.

We claim:

1. A safety seat belt arrangement which includes:

at least one first seat belt including a latch end that passes from a back side of a seat, at least one seat belt buckle secured to a vehicle body on a front side of said seat to which said at least one seat belt latch end is secured when in use, at least one second seat belt that has one end secured to a front of said seat, a second end of said at least one second seat belt with a latch, and at least one buckle secured at a back side of said seat to which said latch of said at least one second seat belt is secured when in use.

2. A safety seat belt arrangement as set forth in claim 1, in which at least one first loop is secured to an upper front end of said seat through which said at least one first seat belt passes, and at least one second loop is secured to the upper front end of the seat through which said at least one second seat belt passes.

3. A safety seat belt arrangement as set forth in claim 2, in which, said at least one second seat belt is retractable.

4. A safety seat belt arrangement as set forth in claim 1, in which, said at least one second seat belt is retractable.

5. A safety seat belt for protecting a person lying on a seat of a vehicle;

said safety seat belt includes a first end which is secured to the vehicle in front of the seat, said safety seat belt includes a second end which includes a latch that secures to a buckle of a vehicle seat belt secured at a back side of the seat;

said seat includes a loop along an upper front end of said seat through which said latch passes, whereby the second end of the safety seat belt passes over a person's body lying prone on the seat to protect the person.

6. A safety seat belt as set forth in claim 5, in which, said seat belt is of a retractable type.

* * * * *